(12) United States Patent
Wewers

(10) Patent No.: US 10,107,718 B2
(45) Date of Patent: Oct. 23, 2018

(54) APPARATUS FOR CAPTURING DATA RELATED TO AN EVENT INDICATING ABNORMAL FUNCTION OF A MACHINE

(71) Applicant: epro GmbH, Gronau (DE)

(72) Inventor: Thomas Wewers, Gronau (DE)

(73) Assignee: epro GmbH (DE)

( * ) Notice: Subject to any disclaimer, the term of this patent is extended or adjusted under 35 U.S.C. 154(b) by 271 days.

(21) Appl. No.: 15/056,075

(22) Filed: Feb. 29, 2016

(65) Prior Publication Data

US 2017/0248497 A1 Aug. 31, 2017

(51) Int. Cl.
*G01M 99/00* (2011.01)
(52) U.S. Cl.
CPC ................. *G01M 99/008* (2013.01)
(58) Field of Classification Search
CPC .................................................. G01M 99/008
See application file for complete search history.

(56) References Cited

U.S. PATENT DOCUMENTS 5,212,645 A * 5/1993 Wildes ............... G05B 19/4065
340/680

OTHER PUBLICATIONS

MMS Machine Monitoring Systems; System Manual MMS 6000; Operating Manual; Shaft Vibration Monitor MMS 6110; Date—Dec. 9, 2007, Valid for Configuration software MMS 6910 W Versions 2.00 f.f, Firmware Versions 1.20 f.f. 6110-0004; Epro GmbH. This manual describes a predecessor product and p. 64 describes a run up and run down feature.

\* cited by examiner

*Primary Examiner* — Yu-Hsi D Sun
(74) *Attorney, Agent, or Firm* — Luedeka Neely Group, P.C.

(57) ABSTRACT

Sensors monitor parameters of a machine and generate sensor signals that are transmitted to a plurality of signal analyzers. A microprocessor in each signal analyzer analyzes a sensor signal and generates an event signal when the sensor signal meets predetermined criteria indicating that the machine is operating abnormally. A circular buffer is connected to receive and record data corresponding to a sensor signal. When the signal analyzer generates an event signal and a capture trigger is created, the data from the circular buffer is transmitted and stored in the nonvolatile memory. Both pre-event data and post-event data are stored in the nonvolatile memory in a selected ratio of pre-event and post-event data. Data lines connect each signal analyzer in a group of signal analyzers, and data corresponding to each signal analyzer in the group is stored into the nonvolatile memory when an event signal is created by a signal analyzer in the group. The signal analyzers may communicate with an external computer that may receive the event signals, analyze the event signals, issue capture signals and control the amount of pre-event data and post-event data that is stored in the nonvolatile memory.

21 Claims, 2 Drawing Sheets

APPARATUS FOR CAPTURING DATA RELATED TO AN EVENT INDICATING ABNORMAL FUNCTION OF A MACHINE

FIELD

The present invention relates to a monitoring apparatus for machinery and particularly relates to a monitoring apparatus designed to analyze and protect the machinery that is monitored.

BACKGROUND OF THE INVENTION

A monitoring apparatus is typically a number of sensors providing signals to specialized computers that analyze the signal and report to other computers that may further analyze the signals and issue commands relating to the monitored machinery. Such apparatus is often used to monitor machinery, such as pumps and electric motors, for the purpose of protecting the machinery itself and for the alternate purpose of maintaining the machinery in proper working condition. When a monitoring apparatus detects a serious fault condition, it may request a shutdown of the machinery. In many cases, machinery is difficult to restart after a shutdown. So, it is important for the monitoring apparatus to only shut down the machinery if there is a serious fault. In addition, it is important to understand why a particular shutdown occurred so that it can be fixed and the machinery can be restarted. A monitoring apparatus may be designed with great care to protect machinery based on many inputs, but often it is difficult to understand why a machine was stopped and thus it is difficult to determine the cause of the shutdown. The present invention addresses this problem.

SUMMARY OF THE INVENTION

In accordance with one embodiment, an apparatus is provided for monitoring a machine. One or more sensors monitor parameters of the machine and generate sensor signals that are transmitted to one or a plurality of signal analyzers that may be referred to herein as cards. A microprocessor in each signal analyzer receives and processes a sensor signal and generates an event signal when the sensor signal meets predetermined criteria indicating that the machine is operating abnormally. A first memory is connected to receive data and continuously records the data corresponding to the sensor signal under the control of a memory manager. When a capture trigger is received by the memory manager, the memory manager transfers data from the first memory and stores the data in a second memory. The first memory may be a circular buffer that records and transmits data rapidly and over-writes old data with new data when the buffer is full. The circular buffer may be volatile to increase its speed. The second memory may be a larger memory than the first memory and typically the second memory is nonvolatile.

The microprocessor of each signal analyzer may be programmed to respond to an event signal generated by the signal analyzer or generated by another signal analyzer to command the memory manager to record particular data from the first memory. For example, the memory manager may transfer data from the first memory to the second memory such that both pre-event data and post-event data are stored in the second memory. The signal analyzer may be further configured to select a ratio of pre-event data to post-event data and to command the memory manager to store the selected ratio of data. The ratio may be determined by the type of event. In other words, different events would cause the microprocessor to record different amounts of pre-event data and post-event data. Alternatively, the ratio could be permanently set by the initial programming of the microprocessor, or the ratio could be set by a user during set up or during actual operation.

Data lines may be used to connect each signal analyzer to other signal analyzers such that the signal analyzers may communicate. In particular, each signal analyzer may be configured to receive event signals from another signal analyzer in a group or every signal analyzer in the group or from sources outside the group. Thus, each signal analyzer in the group is capable of responding to an event signal from another signal analyzer in the group or from a source outside the group. Thus, when an event signal is generated by one signal analyzer in the group, other signal analyzers or all signal analyzers in the group may respond. Thus, all signal analyzers in the group may respond to one event signal by one signal analyzer in the group, and all signal analyzers may respond to the event signal by commanding the memory manager to transfer data from the first memory (for example, a circular buffer) into the second memory (for example, a nonvolatile memory).

An external computer may be provided to facilitate and control the recording of data in the second memory. For example, all of the signal analyzers may be connected by data lines to the external computer, and the external computer may designate groups of signal analyzers that act together. For example, a group of signal analyzers may be designated as a group in the external computer because each of the signal analyzers in the group monitors a particular machine or set of machines. When a signal analyzer generates an event, it is transmitted to the external computer and the external computer will analyze the event to determine what operational commands, if any, should be issued. In addition, the external computer will decide whether the event requires the storage of data in the second memory. If so, the external computer will transmit a capture trigger that is transmitted on the communication lines. The capture signal will cause the memory manager to capture data on the second memory by transferring data from the first memory. The external computer will also make a decision as to the ratio between pre-event data and post-event data and will instruct the memory managers to store data on the second memory so as to store the correct ratio between pre-event data and post-event data. The external computer may be another signal analyzer that is outside the group, or the function of the external computer may be performed by a signal analyzer in the group. There may be multiple groups of signal analyzers and event signals from signal analyzers in the multiple groups may be received and analyzed by a computer that issues capture triggers to one or more memory managers or signal analyzers in one or more groups.

BRIEF DESCRIPTION OF THE DRAWINGS

The present invention may best be understood by reference to the following detailed description of an embodiment when considered in conjunction with the Drawings in which.

DETAILED DESCRIPTION OF THE DRAWINGS

Figure 1:
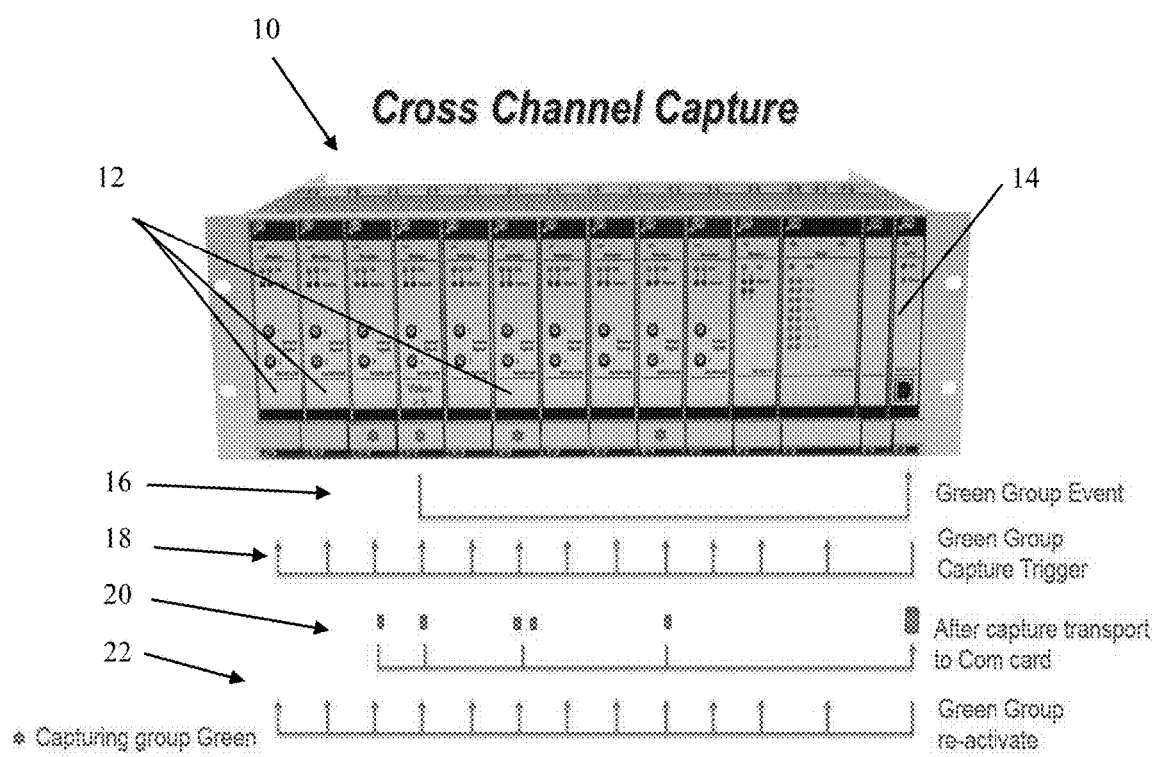
FIG. 1 is a schematic view of an apparatus for monitoring and analyzing equipment for detecting abnormal conditions.

Referring now to FIG. 1, a monitoring apparatus 10 is shown that monitors a variety of parameters of machines in an industrial setting. The apparatus 10 may include numerous cards 12 that constitute signal analyzers that constantly monitor one or more signals from a sensor. For example, one card 12 may be connected to a temperature sensor and it will constantly monitor the temperature of an electric machine. Another card 12 may be connected to an amperage sensor and it will constantly monitor the current supplied to an electric motor, and yet another card 12 may be connected to a vibration sensor and it will constantly monitor and analyze vibration. A group of monitors may be monitoring a single machine, or the group may be monitoring a set of related machines.

Each of the cards 12 includes a first memory that may be characterized as a circular buffer that is constantly recording the data that is input to each of the cards 12. (As used herein, a circular buffer is any memory that records data and continues to store data even after the memory is full by overwriting the oldest data in memory.) When the circular buffer is completely filled with data, it begins to overwrite the oldest data while maintaining the younger data in the buffer as long as possible. For example, if the circular buffer had a capacity of two minutes, it would record data for two minutes and then the buffer would be full. Thereafter, it would begin overwriting data in the circular buffer and it would overwrite the oldest data first. Thus, the buffer will always contain the most recent two minutes of data.

Each of the cards 12 is programmed to analyze the data that it receives from a sensor and to detect an event condition. For example, in the case of temperature, an event may be a temperature that is above a predetermined limit. In the case of vibration, an event may be the detection of a vibration signal within a particular frequency range that has a magnitude that is above a predetermined limit.

As indicated by the graphical line 16, when a particular card 12 detects an event, it, transmits an event signal through a communication port 14 to an external computer. The external computer is programmed to identify the card that produced in the event signal and to identify the type of event that has been detected. The external computer is also preprogrammed to identify a group or groups of cards 12 that are associated with the particular card that generated the event. As indicated by graphical line 18, when the external computer receives the event signal, it responds by transmitting a capture trigger to all cards 12 that are in a green group. (The name "green group" is an arbitrary name chosen to generically represent any type of group.) In response to the capture trigger, all cards 12 in the green group transmit the data from their circular buffers to a second memory, for example a nonvolatile memory, such as an SD card. The data from the circular memory is transmitted to the nonvolatile memory without significantly interfering with the operation of the circular buffer or the card itself. For example, the circular buffer is read and its contents are transferred to the nonvolatile memory even while the circular buffer is continuing to record data and overwrite old data in the circular buffer. A memory manger is programmed into the card 12 for controlling the operations of the circular buffer and the nonvolatile memory on card 12 and the same manager could be programmed to control data storage and transfer operations on the circular buffers and nonvolatile memories of multiple cards. The memory manager could also reside at a location separate from the cards.

After the data has been captured and secured on a second memory which may be located in the card 12, the data may be transmitted through a COM card 14 (a microprocessor based communication computer designed primarily to control communication but capable of other functions) to the external computer for further analysis. Alternatively, the second memory for each of the cards 12 may reside on a different card, such as COM card 14. Likewise, the second memory for each of the cards 12 may be a non-volatile hard disk drive or a solid state memory on the COM card 14. When the external computer verifies that the second memory has received the required data, it issues a command to the green group to reactivate and resume normal monitoring. If the event is determined to be sufficiently important, the external computer may issue a command requesting that the machinery be shut down. If a shutdown occurs, the external computer has or will acquire data from all of the second memory (or memories) of the cards in the green group which should be sufficient to analyze the cause of the event. Multiple groups may be defined and the groups may overlap. For example, a green group may be defined as four sensors and a yellow group may be defined as five sensors, but two sensors may be found in both groups. An event occurring in the yellow group may cause a capture trigger for the green group and the yellow group, or just, the yellow group, or just the green group, depending on the particular application and the programming of the monitoring apparatus.

The capture trigger does not necessarily occur before the command to request a shutdown of the machinery. In fact, in normal operations the shutdown will occur first, and then a command will be issued to the cards 12 to capture data. Thus, the capture trigger may occur after the machinery has stopped operating. In such case, the circular buffers will contain data existing prior to the event, during the event and after the event while the machinery is stopping. This data, including the data collected during a shutdown, will be useful in analyzing the cause of the event, which will be useful in determining an appropriate fix. Alternatively, the capture trigger may be issued immediately upon the occurrence of an event. In which case, each of the cards will be programmed to immediately began transferring data from the first memory (circular buffer) to the second memory (nonvolatile memory), but the first memory will continue to record data even as data is being transferred to the second memory. Then, each card will be programmed to wait for a period of time, and then it will transfer post-event data from the first memory to the second memory. Each card may be independently programmed with respect to the amount of data to be stored. In other words, each card may be programmed to store different amounts or the same amounts of pre-event and post-event data. In addition, a laptop or other portable computer may be plugged into the COM card 14 and it may communicate with the cards 12 like any other external computer. The laptop may download the data stored in card 14 or one or all of the cards 12, or it may reprogram the cards 12 and 14, or it may issue capture triggers.

Figure 2:
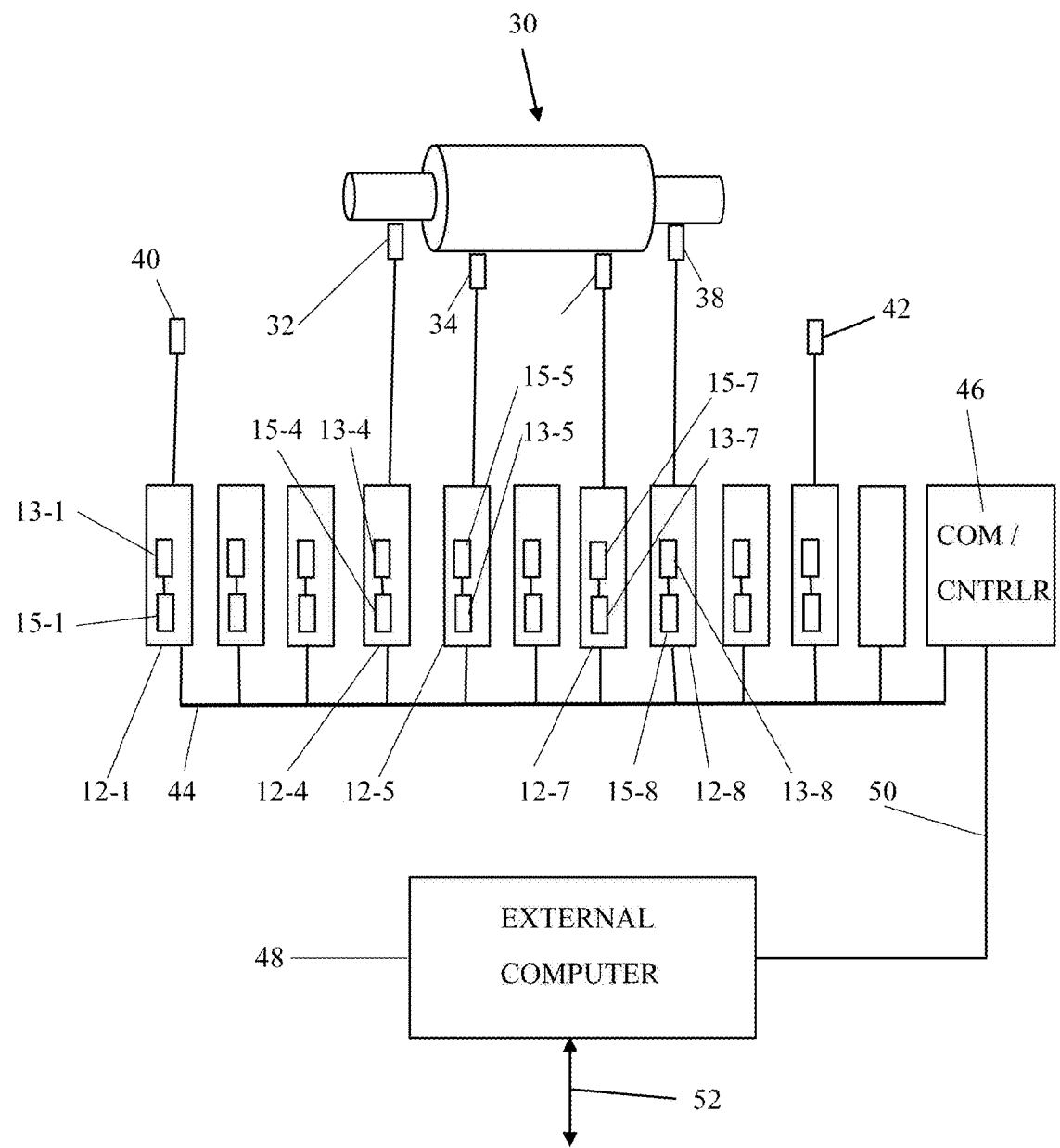
FIG. 2 is a somewhat diagrammatic drawing of the apparatus showing a machine being monitored for abnormal conditions.

Referring now to FIG. 2, a slightly more detailed embodiment of the invention is shown. In this embodiment, hypothetical machine 30 is being monitored by four sensors 32, 34, 36 and 38. For example, sensor 32 may measure the rotational speed of a rotating shaft; sensor 34 may be a vibration sensor; sensor 36 may be a temperature sensor; and sensor 38 may be an electrical sensor detecting current supplied to the machine 30. Each of the sensors is connected to one of the cards 12-1 through 12-10. In this case, sensors 32, 34, 36 and 38 are connected to cards 12-4, 12-5, 12-7 and 12-8, respectively, and collectively these cards and sensors represent a group that is monitoring the machine 30. In this example, sensors 40 and 42 are connected to cards 12-1 and 12-10, and collectively these sensors and cards represent portions of the monitoring apparatus that are outside the group monitoring the machine 30.

Each card includes a microprocessor that manages communication with a sensor and other cards through the communication card 46, which is connected to each of the cards by lines 44. In addition, the cards 12-1 through 12-10 include circular buffers 13-1 through 13-10, respectively, and include nonvolatile memory 15-1 through 15-10, respectively. In this embodiment each card is programmed to monitor and analyze the signal provided by its respective sensor and to determine when an event has occurred. Thus, for example card 12-4 is programmed to monitor the speed sensor 32 and determine the speed of a rotating shaft based on the signal from the sensor 32. It is also programmed with a plurality of speed limits, both upper and lower limits. For example, if the machine is intended to operate at 3600 RPM, the card 12-4 may be programmed with a cautionary upper limit of 3650 RPM and an alarm upper limit of 3700 RPM. Likewise, it may be programmed with a cautionary lower limit of 3550 RPM and an alarm lower limit of 3500 RPM.

In operation, the card 12-4 is programmed to observe the speed of the shaft 32 during startup and do nothing. However, when the operation of the machine 30 stabilizes and the speed of the machine 30 approximates 3600 RPM and is within all of the upper and lower limits, the card 12-4 begins to monitor the speed of the machine against the upper and lower limits. If the machine 30 has a speed that is below one of the lower limits or above one of the upper limits, the card 12-4 creates an event that is reported through lines 44 to a communication card 46 and the event is further reported through lines 50 to an external computer 48.

The external computer 40 is programmed to respond to the event based on a variety of circumstances. For example, if the speed of the machine 30 has dropped below a cautionary limit and the current of the machine as detected by sensor 38 has not reported an event, the external computer 48 may do nothing. However, if the sensor 38 and card 12-7 have reported a current exceeding an upper limit, the external computer 48 may transmit a request to shut down the machine 30. This request may be sent to the other computers or humans that will make the ultimate decision as to whether the machine 30 should be shut down, or the external computer 48 may directly control the machine 30 by sending the request to the actual controllers of the machine 30 and thus initiate a mandatory shutdown of the machine 30 when the sensed parameters meet the shutdown criteria.

In addition to determining what action to take, if any, with respect to the operation of the machine 30, the external computer 48 makes decisions as to what data should be recorded and when. For example, if card 12-4 indicates that the speed of the machine 30 has dropped below 3550 RPM, but remains above 3500 RPM, this event may cause the computer 48 to issue a command to the group to save data to a nonvolatile memory. In this embodiment, each card contains a circular buffer that will record two minutes of data and it has a nonvolatile memory that will record hours of data. In response to a cautionary event reported by card 12-4 indicating that the machine speed has dropped below 3550 RPM, and no other event has been reported, the computer may be programmed to issue a command (a capture trigger) causing the group to capture its data for a one minute period preceding the event and a one minute period following the event. Thus, the computer may wait for one minute after the reporting of the event from card 12-4, and then it will issue a capture trigger that is transmitted to cards 12-4, 12-5, 12-7 and 12-8 causing each of these cards to capture the contents of its circular buffer 13-4, 13-5, 13-7 and 13-8 in the nonvolatile memory 15-4, 15-5, 15-7 and 15-8. The circular buffers are readable without destroying the data contained within the circular buffers or interfering with the operation of the buffers. Thus, as the circular buffers are read into the nonvolatile memory, the buffers continue to store data. On each of the cards, the oldest data is transferred from the circular buffer to the nonvolatile memory first, and the instruction from the external computer 48 provides an exact time at which the data should be stored so that each card stores the data for exactly the same time period. Each of the cards includes a memory manager programmed into the card for controlling the storage and transfer of data on the circular buffers and the nonvolatile memories, and one memory manager on one card may control the storage and transfer operations on multiple cards if desired. Alternatively, the memory manager for the cards could reside on another device such as the external computer 48. In this embodiment however each card includes its own memory manager and controls its own circular buffer and nonvolatile memory.

The process of detecting events at the external computer and triggering the storage of data by particular cards in particular groups is continued indefinitely. At some point an event or a combination of events may be detected by the external computer that will cause the computer to issue a shutdown request. In that event, shutdown of the machine 30 in this hypothetical case will take less than 15 seconds under the most extreme circumstances. Thus, the external computer 48 will issue a shutdown request and then will wait 15 seconds before issuing a capture command to the cards 12-4, 12-5, 12-7 and 12-8. Thus, each of the cards will transfer data from the circular buffers for one minute and 45 seconds prior to the event and for 15 seconds after the event.

The external computer 48 may be programmed to change the ratio between the pre-event data and the post-event data depending upon the circumstances. In the case of a shutdown, the external computer 48 may be programmed to record enough data after the shutdown to completely monitor the process during the shutdown and to monitor the conditions immediately after shutdown, but in this case there has been a judgment that data is not required for a significant period of time after a shutdown. Thus, the ratio between pre-event and post-event data is modified to increase the pre-event data. It will be appreciated that this ratio can be adjusted depending upon the events detected and depending upon the actions requested by the external computer 48. The external computer 48 also communicates with additional computers and users through data line 52. Thus, the external computer 48 may receive instructions on the data line 52 requesting it to issue a capture trigger to cause one or more of the signal analyzers to read data from its circular buffer and store the data on a second memory, preferably a nonvolatile memory. The instructions appearing on data lines 52 may be generated by other computers or may be generated in response to user inputs.

In some applications one or more cards may be monitoring critical data and the cards may be programmed to directly issue operational commands, such as a shutdown request. In this example, it may be determined that the detection of speed in excess of the upper limit of 3700 RPM requires an immediate shutdown request. Rather than relaying this information through multiple computers and then issuing a decision, the card 12-4 may be programmed to issue a shutdown request at any time the machine speed is detected above the upper limit of 3700 RPM for a specified length of time. This shutdown request is transmitted through the COM card 46 directly to a machine controller and the shutdown is implemented. In addition, the card 12-4 is further programmed to issue a capture trigger to its group. The card 12-4 waits for 15 seconds after it issues the shutdown command to issue a capture command causing cards 12-4, 12-5, 12-7 and 12-8 to record the contents of the circular buffers into the nonvolatile memories of each card. In this case, each card will store one minute and 45 seconds of pre-event data and 15 seconds of post-event data in the nonvolatile memory. Each card can be programmed with the authority to issue operational commands and capture triggers causing other cards to capture data on their nonvolatile memory.

From the above examples, it may be appreciated that decisions as to when data should be captured and as to when operational actions should be taken may be distributed between the various cards 12-4 through 12-10, the COM/controller card 46, the external computer 48 or other computers. The manner in which decisions are made as to when and how data is recorded onto a second memory within the cards or external to the cards will depend upon each application. In some applications, it may be preferred to allow the cards 12-1 through 12-10 to store data into the second memory autonomously with little or no input from external computers. In other words, the cards themselves will communicate with each other and be programmed to make independent decisions as to when a particular card should store data from the first memory (circular buffer) into its second memory. Allowing the cards to operate autonomously or semi-autonomously decreases the computing burden on external computers. However, in other applications the computing burden on external computers will not be a concern and the reliability of the overall system may be improved by allowing an external computer 48 to determine both operational decisions and decisions as to when and how each card should store data from its circular buffer to its nonvolatile memory.

The embodiments described above are intended to be examples illustrating how the invention may work in a particular application, but these examples should not be construed as limiting. The invention is capable of numerous rearrangements, modifications and substitutions of parts without departing from the scope of the invention as defined by the appended claims.

The invention claimed is:

1. An apparatus for monitoring machinery comprising:
a plurality of sensors connected to monitor parameters of a machine and to generate sensor signals corresponding to the monitored parameters;
a plurality of memory managers connected to receive capture signals;
a plurality of signal analyzers connected to receive the sensor signals from the plurality of sensors, each of the signal analyzers including:
  a. a first memory connected to the microprocessor and connected to and controlled by a first one of the memory managers for continuously recording a sensor signal, and
  b. a microprocessor for analyzing the sensor signal that is recorded by the first memory and for generating an event signal when the sensor signal meets defined criteria indicating that the machine is operating abnormally;
  c. a second memory connected to the first memory and being connected to and controlled by the first memory manager; the first memory manager being operable to control the first and second memories to record the sensor signal from the first memory into the second memory in response to a first capture trigger; and
the first memory, second memory, and processor of each signal analyzer being physically separate from the first memories, the second memories, and the processors of the other signal analyzers.

2. The apparatus of claim 1 wherein the first memory manager is programmed to respond to the first capture trigger that is associated with a first event signal, to record data from the first memory to the second memory corresponding to a time period that extends from before the first event signal to after the first event signal such that the recorded data includes both pre-event data and post-event data.

3. The apparatus of claim 1 further comprising:
the memory managers being programmed to identify a first group of signal analyzers within the plurality of signal analyzers,
data lines connected to each signal analyzer in the group of signal analyzers,
the memory managers being programmed to respond to a group capture trigger by reading data from the first memory and writing the data into the second memory of each signal analyzer in the first group.

4. The apparatus of claim 3 further comprising an external computer connected to the signal analyzers of the group and being programmed to issue the group capture trigger in response to an event signal.

5. The apparatus of claim 3 wherein each signal analyzer in the group is programmed to transmit the event signal on the data lines and at least one signal analyzer in the group is programmed to monitor the data lines and issue the group capture trigger in response to an event signal from one of the signal analyzers in the group.

6. The apparatus of claim 1 further comprising:
a first group of signal analyzers and a second group of signal analyzers within the plurality of signal analyzers,
data lines connected to each signal analyzer in the first and second groups of signal analyzers,
an external computer connected to receive event signals from the first and second groups of signal analyzers and to transmit a first group capture trigger and a second group capture trigger in response to the received event signals,
wherein at least one memory manager is programmed to respond to the first group capture trigger by reading data from the first memory and writing the data into the second memory for all first and second memories in the first group, and
wherein at least one memory manager is programmed to respond to the second group capture trigger by reading data from the first memory and writing the data into the second memory for all first and second memories in the second group.

7. The apparatus of claim 6 wherein at least one signal analyzer belongs to both the first group and the second group.

8. The apparatus of claim 6 wherein the external computer transmits a first group capture trigger in response to an event signal from a signal analyzer in either the first or the second group.

9. The apparatus of claim 1 further comprising:
a first group of signal analyzers and a second group of signal analyzers within the plurality of signal analyzers, data lines connected to each signal analyzer in the first and second groups of signal analyzers, at least one signal analyzer connected to receive event signals from the first and second groups of signal analyzers and to transmit at least one of a first group capture trigger and a second group capture trigger in response to the received event signals, wherein at least one memory manager is programmed to respond to the first group capture trigger by reading data from the first memory and writing the data into the second memory for all first and second memories in a first group, and wherein at least one memory manager is programmed to respond to the second group capture trigger by reading data from the first memory and writing the data into the second memory for all first and second memories in a second group.

10. The apparatus of claim 1 further comprising:
an external computer connected to the plurality of signal analyzers, the external computer being responsive to the event signals generated by the plurality of signal analyzers:
 a. to analyze the condition of the machine being monitored,
 b. to generate operational control signals for controlling the operation of the machine, and
 c. to generate capture triggers that are transmitted to one or more selected memory managers;
the one or more selected memory managers being responsive to the capture triggers to transmit data from the first memory to the second memory.

11. The apparatus of claim 10 wherein the external computer is further configured to determine a desirable amount of pre-event data and post-event data that should be recorded on the second memory; and to generate and transmit signals to at least one memory manager causing it to store the desirable amount of pre-event data and post-event data.

12. The apparatus of claim 10 wherein each signal analyzer is configured to determine a desirable amount of pre-event data and post-event data that should be recorded on the second memory by the memory manager based on an event and being further configured to transmit control signals to at least one memory manager, the at least one memory manager storing the desirable amount of pre-event data and post-event data on the second memory in response to the control signals and the capture trigger.

13. The apparatus of claim 10 wherein each signal analyzer is assigned to at least one group and wherein at least one memory manager is configured to transfer data that is associated with the signal analyzers in the group from the first memory to the second memory when any signal analyzer in the group generates an event signal.

14. The apparatus of claim 1 wherein each first memory is a ring buffer and each second memory is a non-volatile memory.

15. A method for monitoring machinery comprising the steps of:
connecting a plurality of sensors to one or more machines;
monitoring parameters of the machines and generating sensor signals that correspond to the monitored parameters with the sensors;
receiving the sensor signals from the plurality of sensors with a plurality of signal analyzers, each signal analyzer including a microprocessor, a first memory and a second memory, the first memory, second memory, and processor of each signal analyzer being physically separate from the first memories, the second memories, and the processors of the other signal analyzers;
analyzing the sensor signals with the signal analyzers and generating an event signal when one or more of the sensor signals meets defined criteria indicated that the machine is operating abnormally;
receiving one or a plurality of sensor signals from the one or plurality of sensors at one or a plurality of connected memory managers;
continuously recording data corresponding to each sensor signals with the first memories, each of the first memories being connected to and controlled by one of the memory managers;
generating a capture signal in response to the event signal, and
recording data from the first memory to the second memory of at least one of the signal analyzers in response to the capture trigger.

16. The method of claim 15 wherein at least one of the memory managers is programmed to respond to the capture trigger to read data from the first memory and record the data to the second memory corresponding to a time period that extends from before the event to after the event such that both pre-event data and post-event data is stored on the second memory.

17. The method of claim 15 further comprising the steps of:
providing a group of signal analyzers and data lines connected to each signal analyzer in the group;
analyzing the sensor signals using the group of signal analyzers and generating an event signal when one or more of the sensor signals meets defined criteria indicated that the machine is operating abnormally;
producing a group capture signal when one analyzer in the group of signal analyzers generates an event signal and
for each signal analyzer in the group, reading data from the first memory of the signal analyzer and writing the data into the second memory of the signal analyzer under the control of at least one memory manager in response to the group capture trigger.

18. The method of claim 17 further comprising the step of issuing the group capture trigger using an external computer connected to the signal analyzers of the group.

19. The method of claim 15 further comprising the steps of:
providing a first group of signal analyzers and a second group of signal analyzers within the signal analyzers;
providing data lines connected to each signal analyzer in the first and second groups of signal analyzers;
receiving event signals with a connected external computer sent from the first and second groups of signal analyzers;
transmitting with the connected external computer one or more of a first group capture trigger and a second group capture trigger in response to the received event signals;
responding to the first group capture trigger by reading data from the first memory and writing the data into the second memory of each signal analyzer in the first group; and
responding to the second group capture trigger by reading data from the first memory and writing the data into the second memory of each signal analyzer in second group.

20. The method of claim 15 further comprising the steps of:

providing a first group of signal analyzers and a second group of signal analyzers within the signal analyzers;

providing data lines connected to each signal analyzer in the first and second groups of signal analyzers;

receiving event signals from the first and second groups of signal analyzers with at least one signal analyzer;

transmitting at least one of a first group capture trigger and a second group capture trigger with the at least one signal analyzer in response to the received event signals;

responding to the first group capture trigger with at least one memory manager by reading data from the first memory and writing the data into the second memory of each signal analyzer in the first group; and responding to the second group capture trigger with at least one memory manager by reading data from the first memory and writing the data into the second memory of each signal analyzer in the second group.

21. The method of claim 15 further comprising the steps of:

analyzing the condition of the machines being monitored using an external computer connected to the signal analyzers in response to the event signals generated by the signal analyzers;

generating operational control signals for controlling the operation of the machine using the external computer in response to the event signals generated by the one or more signal analyzers; and generating capture triggers and transmitting the capture triggers to one or more selected memory managers using the external computer in response to the event signals generated by the one or more signal analyzers;

transmitting data from the first memory to the second memory of one or more signal analyzers using the one or more selected memory managers in response to the capture triggers.

\* \* \* \* \*